US006961302B2

(12) United States Patent
Wang et al.

(10) Patent No.: US 6,961,302 B2
(45) Date of Patent: Nov. 1, 2005

(54) METHOD AND STRUCTURE FOR INTENSIFYING TRACK SEEKING SIGNALS FROM AN OPTICAL DISK

(75) Inventors: Shyh-yeu Wang, Hsinchu Industrial Park (TW); Biing-Hwang Lin, Miaoli (TW); Chun-Ying Lin, Changhua (TW)

(73) Assignee: Ritek Corporation, Hsinchu (TW)

( * ) Notice: Subject to any disclaimer, the term of this patent is extended or adjusted under 35 U.S.C. 154(b) by 0 days.

(21) Appl. No.: 10/065,679

(22) Filed: Nov. 8, 2002

(65) Prior Publication Data

US 2003/0137923 A1 Jul. 24, 2003

(30) Foreign Application Priority Data

Nov. 9, 2001 (TW) ........................................ 90128062 A

(51) Int. Cl.[7] ................................................ G11B 7/26
(52) U.S. Cl. .................... 369/284; 369/13.38; 428/64.1
(58) Field of Search ................................ 369/284, 283, 369/280, 286, 288, 13.38; 428/64.1, 64.4

(56) References Cited

U.S. PATENT DOCUMENTS

| 4,871,601 | A | * | 10/1989 | Miura et al. ................ 428/64.9 |
| 5,238,722 | A | * | 8/1993 | Yashiro et al. .............. 428/64.4 |
| 5,293,367 | A | * | 3/1994 | Kadowaki et al. ........ 369/44.37 |
| 5,406,541 | A | * | 4/1995 | Kay ............................ 369/120 |
| 6,636,477 | B1 | * | 10/2003 | Miyamoto et al. .......... 369/286 |
| 6,667,948 | B2 | * | 12/2003 | Chen et al. ............... 369/275.2 |
| 6,678,237 | B1 | * | 1/2004 | Edwards et al. ............ 369/286 |

* cited by examiner

*Primary Examiner*—Angel Castro
(74) *Attorney, Agent, or Firm*—Jianq Chyun IP Office

(57) ABSTRACT

A method and structure for intensifying track seeking signals from an optical disk, in particular, a recordable digital versatile disk (DVD-R). With the addition of an optical correction layer between a dye material layer and a reflection layer inside the DVD-R, track-seeking signals of the optical disk are intensified and recording quality of the optical disk is improved. The optical correction layer is a transparent or semi-transparent layer made from inorganic materials. The optical correction layer is formed over the dye material layer in a sputtering process.

11 Claims, 1 Drawing Sheet

METHOD AND STRUCTURE FOR INTENSIFYING TRACK SEEKING SIGNALS FROM AN OPTICAL DISK

CROSS REFERENCE TO RELATED APPLICATIONS

This application claims the priority benefit of Taiwan application serial no. 90128062, filed Nov. 9, 2001.

BACKGROUND OF INVENTION

1. Field of Invention

The present invention relates to a method and structure for intensifying track seeking signals from an optical disk. More particularly, the present invention relates to a method and structure for intensifying track-seeking signals from a recordable digital versatile disk (DVD-R).

2. Description of Related Art

Due to a large storage capacity, digital versatile disk (DVD) has become a favored medium for holding optical data since its introduction in 1997. According to the development history of the recordable compact disk (CD-R), the demand for DVD-R is likely going to be fast too.

However, the production of DVD-R faces one major issue. Fabricating a DVD-R is significantly more difficult than a conventional CD-R. The spiraling track from inner to outer area in a conventional CD-R has a track depth of about 160 nm~220 nm, a track width of about 500 nm~800 nm and a track pitch of about 1.6 $\mu$m. On the other hand, a conventional DVD-R has a track depth of about 140 nm~200 nm, a track width of about 300 nm~500 nm and a track pitch of about 0.74 $\mu$m. Both the CD-R and the DVD-R are manufactured in a similar way. First, spiraling tracks are etched onto a stamper mold. Thereafter, injection molding is repeatedly carried out to produce a large number of substrates with the spiraling tracks. Next, a layer of dye having a thickness between 50~200 nm is formed over the substrate by spin-coating. Finally, a reflection layer and a layer of protective plastic are sequentially formed over the layer of dye.

The spin-coating process in the fabrication of CD-R and DVD-R mainly serves to spread a uniform layer of dyestuff on the substrate. By controlling the coating parameters, the amount of dye settling inside the tracks and on the landing area between the tracks can be precisely adjusted so that optical path difference (Ld) between the track and the landing area is proper. Through careful adjustment of the optical path difference, a disk manufacturer is able to control the intensity of the track seeking signals and influence the recording quality of the disk. Obviously, another method of changing the optical path difference is to modify depth and width of the tracks. Track depth has a direct influence while track width has an indirect influence on the optical path difference. In general, difference in track depth between the DVD-R and CD-R is small but track width of DVD-R is only half that of the CD-R. Hence, coating has a considerable effect on the optical path difference of a DVD-R. This means that the spraying identical dyestuff onto the tracks and landing of a CD-R and DVD-R to form a layer of dye will result in considerable difference in optical path due to a halving of the track width of the DVD-R compared with the CD-R. Proper control of the optical path difference is normally achieved by selecting the right dye, selecting a suitable solvent, adjusting the track depth and width and controlling the coating parameters. Controlling the coating parameters means adjusting the dye concentration within the coating solvent, the coating speed, the rotation period and so on. Although there seems to be a host of parameters that can be selected to provide proper adjustment, the number of alternatives is quite limited in practice. The substrate of a disk is normally fabricated using polycarbonate material. Since polycarbonate material resists most solvents poorly, the permissible options are only alcoholic and petroleum solvents. However, most alcoholic or petroleum solvents are poor solvents for dissolving dyes leading to a severe limitation on the type of dyes that can be selected. Furthermore, too deep a track is difficult to fabricate by injection molding. In general, a CD-R having a track depth approaching 200 nm is hard to make. Therefore, the fabrication of DVD-R with such a track depth is even harder because a DVD-R has a track width only half that of the CD-R. In other words, possible variation in the spatial dimension for a DVD-R is quite limited. Finally, the effect caused by tuning the coating parameters is only minor.

SUMMARY OF INVENTION

Accordingly, one object of the present invention is to provide a method and structure for intensifying track seeking signals from a recordable digital versatile disk (DVD-R). The method includes forming an additional optical correction layer over the dye layer inside a digital versatile disk by sputtering. The optical correction layer effectively changes the intensity of tracking signals from the disk and hence improves the recording quality of the disk.

To achieve these and other advantages and in accordance with the purpose of the invention, as embodied and broadly described herein, the invention provides a structure for intensifying tracking signals from an optical disk, at least comprising a substrate; a dye material layer over the substrate; an optical correction layer over the dye material layer; and a reflection layer over the optical correction layer. The optical correction layer between the dye material layer and the reflection layer is a layer for improving tracking signals from the optical disk.

To achieve these and other advantages and in accordance with the purpose of the invention, as embodied and broadly described herein, the invention provides a method of manufacturing a recordable digital versatile disk (DVD-R), comprising the steps of: forming a substrate by injection molding; forming a dye material layer over the substrate by spin-coating; forming an optical correction layer over the dye material layer by sputtering; and forming a reflection layer over the optical correction layer by sputtering so that the optical disk has sufficient reflectivity. The optical correction layer is a transparent or semi-transparent made from inorganic material.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
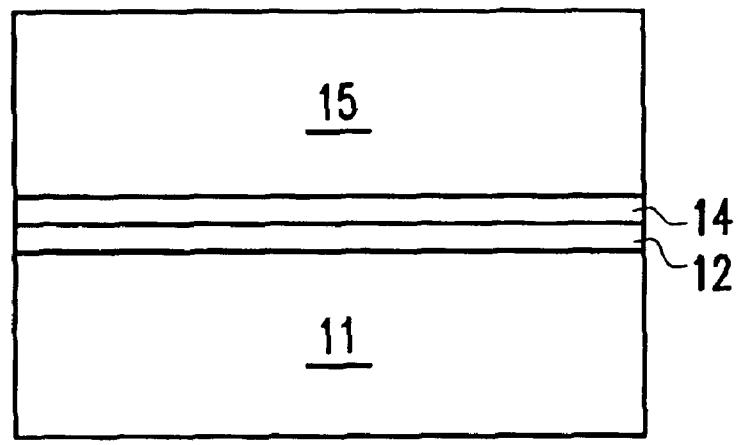
FIG. 1 is a cross-section view showing the structure of a conventional recordable digital versatile disk (DVD-R)

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a cross-section view showing the structure of a conventional recordable digital versatile disk (DVD-R). A conventional DVD-R has a substrate 11 with a stack of layers including a layer of dye 12, a layer of reflective material 14 and a cover layer 15 thereon.

This invention provides a method and a structure for intensifying the tracking signals from a DVD-R. One major characteristic of this invention is the introduction of an addition transparent or semi-transparent optical correction layer between the layer of dye and the layer of reflection material to increase tracking signal intensity and improve recording quality. The optical correction layer is formed in a sputtering process.

Figure 2:
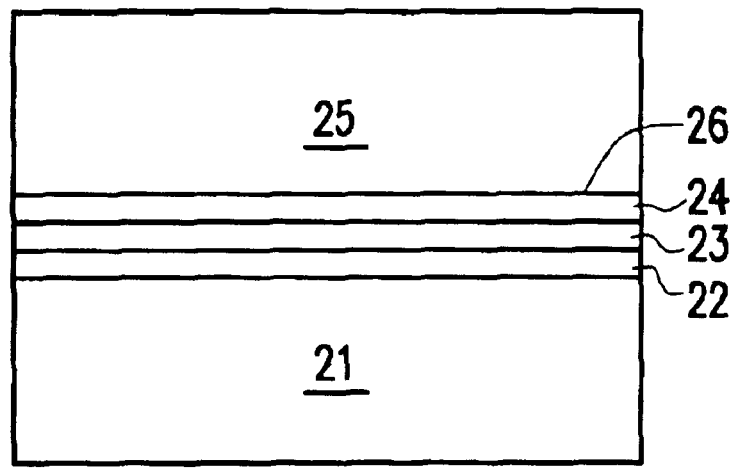
FIG. 2 is a cross-section view showing the structure of a recordable digital versatile disk (DVD-R) according to this invention.

FIG. 2 is a cross-section view showing the structure of a recordable digital versatile disk (DVD-R) according to this invention. The DVD-R according to this invention has a substrate 21, a dye material layer 22, an optical correction layer 23, a reflection layer 24 and a cover layer 25. The substrate has a thickness of about 0.6 mm and includes a continuous spiral track traveling from an inner circle to an outer circle. The track has a track pitch of about 0.74 $\mu$m, a track depth between about 140~200 nm and a track width between about 300~500 nm. The dye material layer 22 has a thickness between about 50~200 nm. The types of dyes used to fabricate the dye material layer 22 include cyanine, phthalocyanine, coupled nitrogen compound or other dyestuffs. Wavelength at which there is a maximum absorption of light should be within the range 500~650 nm. The optical correction layer 23 has a thickness between about 10~1000 Å. However, the optical correction layer 23 preferably has a thickness between 30~300 Å. The optical correction layer 23 can be a transparent or a semi-transparent layer with a reflectivity that meets the standard specification of an optical disk. Materials that can be used for fabricating the optical correction layer 23 include a compound of a metal, silicon and oxygen, nitrogen, sulfur and carbon. The reflection layer 24 has a thickness between about 10~150 nm. Materials that can be used for fabricating the reflection layer 24 include gold, silver, aluminum and an alloy of them.

To fabricate the DVD-R according to this invention, the spiral pattern on a stamper mold is transferred to a large number of polycarbonate substrates 21 each having a thickness of about 0.6 mm in repeated injection molding. Thereafter, a dye material layer 22 is formed over the substrates 21 in a spin-coating process. Next, an optical correction layer 23 is formed over the dye material layer 22 in a sputtering process. Finally, a reflection layer 24 is formed over the optical correction layer 23 in a plating process to provide the disk with sufficient optical reflectivity. The upper surface 26 of the reflection layer 24 in a completed disk may glue up with another blank plastic disk 25 immediately to form a DVD-R having an overall thickness of 1.2 mm. Alternatively, an additional protective layer may form over the reflective layer 24 before gluing another blank plastic disk 25 onto the protective layer. The following is a more detailed description of the embodiment of this invention.

A layer of dye is deposited onto a substrate having a spiral track thereon by spin-coating. Thereafter, a composite optical correction layer is formed over the dye-coated substrate by sputtering different materials each having a different thickness by sputtering. The tracks on the substrate have a track pitch of 0.74 m, a track depth of about 160 nm and a track width of about 410 nm. The solvent for dissolving the dye is tetra-fluoro-pentanol (TFP) and dye concentration within the solvent is about 2%. Materials for fabricating the optical correction layer include zinc sulfide/silicon dioxide (ZnS/SiO$_2$) and aluminum nitride (AlN). Radio frequency sputtering forms zinc sulfide/silicon dioxide (ZnS/SiO2) layers with respective thickness of about 100 Å, 150 Å and 200 Å. DC reactive sputtering forms aluminum nitride (AlN) layers with respective thickness of about 50 Å, 100 Å and 150 Å. The reflection layer is fabricated using silver.

After fabricating the DVD-R, Dr. Schenk"s method can be used to test its $1^{st}$ order diffraction value, a Pulstec DVD-R/RW machine can be used to test the pre-write signals, a Pioneer DVR-A03 can be used to carry out recording and a Pulstec DDU-1000 machine can be used to test post-write signals. Results of testing are summarized in Table 1 below.

TABLE 1

|  | ZnS SiO$_2$ | | | | AlN | | | |
| --- | --- | --- | --- | --- | --- | --- | --- | --- |
|  | 0 | 100 | 150 | 200 | 0 | 50 | 100 | 150 |
| $1^{st}$ order diffraction value | 6.66 | 10.12 | 13.01 | 16.53 | 7.8 | 10.7 | 14.8 | 19.2 |
| TCS | 0.169 | 0.189 | 0.18 | 0.202 | 0.19 | 0.208 | 0.218 | 0.22 |
| RCb | 0.029 | 0.036 | 0.041 | 0.044 | 0.41 | 0.54 | 0.059 | 0.076 |
| Jitter (%) | 10.95 | 9.03 | 8.78 | 8.99 | 11.64 | 9.50 | 8.89 | 9.04 |
| PP | 0.271 | 0.354 | 0.376 | 0.405 | 0.327 | 0.369 | 0.393 | 0.405 |

As shown in Table 1, considerable improvement in the $1^{st}$ order diffraction value of the optical disk is seen after forming an optical correction layer. Furthermore, the pre-write radial contrast (RC) and tracking gross signal (TCS) also have significant variation in value. RC and TCS provide two major factors for assessing the intensity of tracking signals submitted to an optical disk reader during recording. If the value of RC and TCS are too small, the optical reader may not be able to find the track during recording. Hence, how to increase the RC and TCS values through manufacturing without comprising recording quality is an important issue in fabricating optical storage disk.

Sputtering of material over the dye material layer to form an optical correction layer according to this invention has proved to be effective in increasing RC and TCS values. In fact, the formation of the optical correction layer provides more room for using other types of dyestuffs. Some dyestuff that may lower the RC value or TCS value too much can now be used because the optical correction layer can be used to boost the $1^{st}$ order diffraction value, the RC value or the TCS value. Similarly, some other solvents that may lower the 1$^{st}$ diffraction value, the RC value or the TCS value too much can now be used because of the optical correction layer in this invention. In other words, this invention expands the means for fabricating an optical disk.

Aside from an increase in pre-write TCS and RC values, Table 1 also indicates that the post-write push-pull (PP) value also increases. Furthermore, even jittering of the optical disk improves considerably. Thus, this invention not only increases the means of fabricating the optical disk, but also improves the recording quality of the optical disk.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A structure for intensifying tracking signals from an optical disk, at least comprising:

a substrate;

a dye material layer over the substrate;

an optical correction layer only on one side of the dye material layer opposite to the substrate; and a reflection layer over the optical correction layer, wherein the optical correction layer between the dye material layer and the reflection layer is a layer for improving tracking signals from the optical disk.

2. The structure of claim 1, wherein the optical disk includes a recordable digital versatile disk (DVD-R).

3. The structure of claim 1, wherein the optical correction layer is a transparent or a semi-transparent layer.

4. The optical correction layer of claim 3, wherein material constituting the transparent or semi-transparent layer is selected from a group of inorganic compound consisting of metal, silicon and oxygen, nitrogen, sulfur and carbon.

5. The structure of claim 1, wherein the optical correction layer is formed in a sputtering process.

6. The structure of claim 1, wherein maximum absorption of light by the dye occurs at a wavelength between 500~650 nm.

7. The structure of claim 1, wherein optical correction layer has a thickness between 10 Å to 1000 Å.

8. The structure of claim 1, wherein the optical correction layer has a thickness between 30 Å to 300 Å.

9. The structure of claim 1, wherein material constituting the reflection layer is selected from a group consisting of gold, silver, aluminum and an alloy thereof.

10. The structure of claim 1, wherein the optical correction layer increases 1$^{st}$ order diffraction.

11. The structure of claim 1, wherein the dye material layer is organic.

* * * * *